Sept. 5, 1950      R. E. BUTLER      2,521,282
ELECTRICALLY HEATED PLASTICS PRESS Filed Nov. 21, 1947      3 Sheets-Sheet 1

INVENTOR.
Roy E. Butler
BY
Mellin + Hanscom
ATTORNEYS

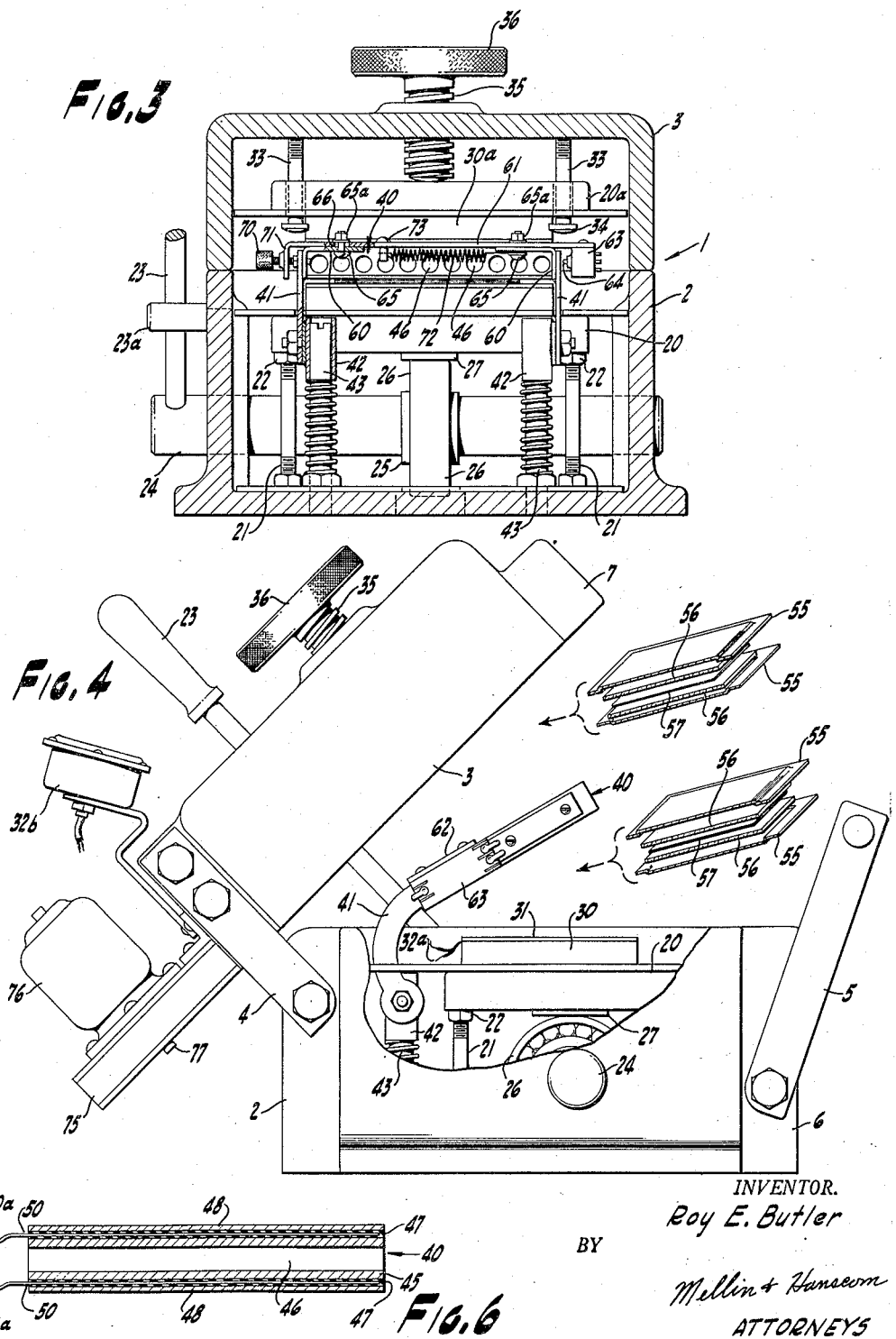

INVENTOR.
Roy E. Butler
BY
Mellin + Hanscom
ATTORNEYS

Patented Sept. 5, 1950

2,521,282

UNITED STATES PATENT OFFICE 2,521,282

ELECTRICALLY HEATED PLASTICS PRESS

Roy E. Butler, San Francisco, Calif.

Application November 21, 1947, Serial No. 787,333

5 Claims. (Cl. 18—17)

This invention relates to an apparatus for molding plastic materials, and in particular for molding plastic covers on identification cards and the like.

It is an object of the invention to provide an apparatus for molding plastic objects and the like, and more particularly for molding plastic covers on identification cards and the like, which is efficient in its operation, both in the heating and cooling steps.

It is a further object of the invention to provide a molding apparatus for molding plastic articles under heat and pressure, which is compact in design, which performs automatically the functions of heating and compressing the plastic material, of setting or curing the molded object and of cooling the object after molding and setting.

These and other objects of the invention will be apparent from the following description and the appended claims.

The apparatus of the invention comprises at least two platens, positionable one on top of the other, and preferably three such platens stacked one on top of the other; means for applying pressure to the faces of the platens; means for supplying heat to one of the platens (to the middle platen in the preferred embodiment employing three platens); and means for automatically cutting off the supply of heat when temperature of the heated platen reaches a predetermined value and for turning on a current of cooling air to cool the heated platens and the molded objects.

The invention will be better understood by reference to the accompanying drawings illustrating the preferred embodiment of the invention.

In the drawings:

Fig. 3 is a sectional view of the apparatus, partly in elevation, taken along the line 3—3 of Fig. 2.

Fig. 4 is a side elevation, partly in section, showing the manner in which the mold assemblies are inserted between the platens.

Fig. 6 is a longitudinal cross-sectional view of the heating element as viewed in Fig. 2, but in greater detail and to an enlarged scale.

Figure 1:
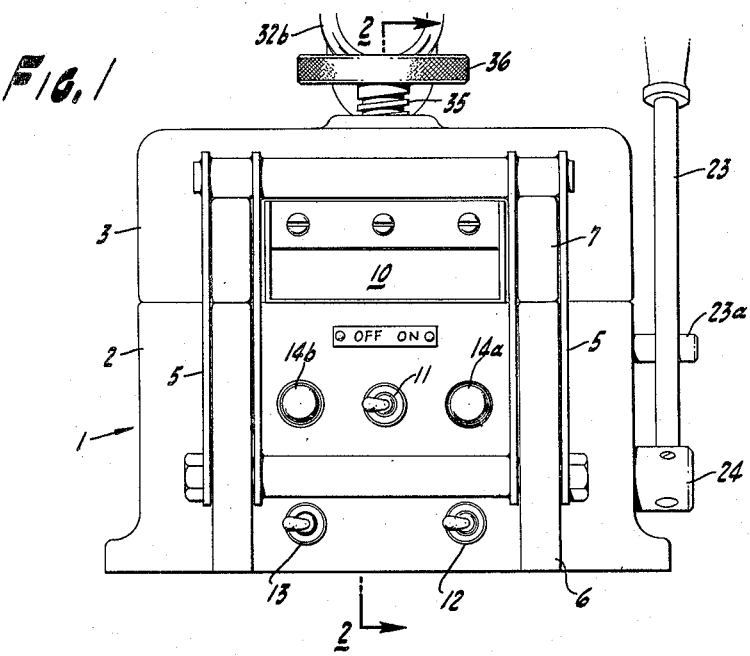
Fig. 1 is a front elevation of the apparatus.

Referring now to the figures of the drawings, the apparatus is enclosed by and supported within a casing generally designated as 1, comprising a bottom portion 2 and a lid or cover portion 3, the lid 3 being hingedly attached to the rear portion of bottom 2 by means of hinge 4 as shown more clearly in Fig. 4. Bottom portion 2 is also provided with locking member or latch 5 which is rotatably connected to flange 6 on bottom portion 2 and engages lugs 7 on cover 3 when the apparatus is in closed, locked position. As shown more clearly in Fig. 2, cover 3 is also provided with a rear passage or opening 8 and a front passage 9 in alignment with passage 8, front passage 9 being partly covered for protection against entry of dust by shelf 10. On the front face of bottom portion 2 are a main switch 11, a low heat switch 12, an over-riding switch 13, and indicating lights 14a and 14b.

Positioned within the chamber defined by bottom 2 and cover 3 is the mechanism for compressing, heating and cooling the objects to be molded. This mechanism comprises a bottom platen 20 mounted on posts 21. The height of platen 20 is adjustable by means of nuts 22 threaded on the upper threaded portion of posts 21, platen 20 being loosely fitted over the projecting tips of posts 21, as by means of recesses or cavities (not shown) fitting over and loosely engaging said tips. Platen 20 is also adjustable vertically by means of a lever 23 acting through shaft 24, eccentric cam 25 and ring bearing 26, which engages a bearing plate 27 secured to the underside of platen 20. Lever 23, when in released position, rests against lugs 23a. Positioned on and secured to the upper surface of platen 20 is an asbestos pad 30 having an asbestos paper liner 31 secured to the top thereof. Positioned immediately underneath liner 31 is a thermocouple 32 in contact with the asbestos liner, having leads 32a connecting with thermometer 32b secured to the rear of cover 3. A similar but inverted upper platen 20a, having an asbestos pad 30a and an asbestos paper liner 31a is suspended from adjustable inverted guide members or posts 33 screwed into the roof of cover 3 and having screw heads 34 to limit the downward travel of platen 20a. Screw shaft 35 threaded through the roof of cover 3 engages the upper surface of top platen 20a and by manipulation of head member 36 exerts downwardly directed pressure on platen 20a.

Positioned between lower and upper platens 20 and 20a is an intermediate platen or heating element 40, described in more detail hereinbelow. Heating element 40 is hinged by means of arms 41 and sleeves 42 to threaded posts 43, by which means the vertical level of heating element 40, when in horizontal position, can be readily adjusted.

Referring now more particularly to Fig. 6 of the drawings, showing the heating element 40 in longitudinal cross section, the heating element is a composite structure comprising a central portion or grid 45 of aluminum or other suitable metal having a large coefficient of expansion and provided with longitudinal passages 46 running from the rear to the front of the element, a fibrous layer 47 of suitable heat resistant material covering the top and bottom surfaces of the grid element, and metal plates 48 covering the top and bottom fibrous layers and forming the upper and lower surfaces of heating element 40. Embedded within each fibrous layer 47 are resistance wires 50, having leads 50a for connection with the electrical circuit, as explained in detail below.

The operation of the apparatus as thus far described is as follows: Referring more particularly to Fig. 4 of the drawings, cover 3 is swung backward into the position shown and heating element 40 is also swung backward as shown. The mold assemblies are put together as shown in Fig. 4, with upper and lower molds 55 (shown for purposes of illustration as shallow, dish-like structures) enclosing upper and lower plastic sections 56, between which is sandwiched an identification card or other similar object 57. One such assembly is placed upon lower platen 20, then heating element 40 is swung downward on top of the assembled structure, the second assembly is placed on top of heating element 40, cover 3 is closed, which automatically brings upper platen 20a down on top of or close to the upper mold assembly. Pressure is then exerted on the upper and lower platens by moving lever 23 forward (in the right-hand direction in the view of Fig. 4), and by screwing down screw shaft 35 by means of head member 36. When sufficient pressure has been applied, the apparatus is then in readiness for application of heat.

Figure 5:
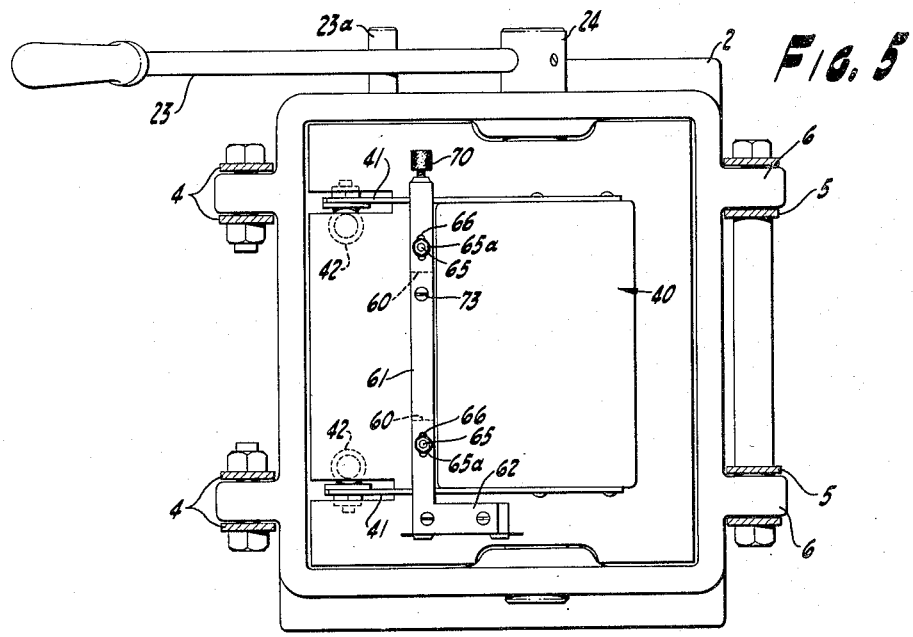
Fig. 5 is a plan view of the apparatus with the lid or cover portion removed.

Referring now more particularly to Figs. 3 and 5, brackets 60 secured to arms 41 support transverse bar 61 rearwardly of and parallel to the rear edge of heating element 40. Bar 61 is constructed of any suitable metal having a low thermal coefficient of expansion, such as steel, but preferably the metal known as Invar. One end of bar 61 has a lateral extension 62 extending perpendicularly from the main portion of bar 61. From extension 62 is suspended a thermostatic switch 63, which is provided internally with any suitable pressure-sensitive switch element (not shown). A spring loaded pin 64 protrudes through the inner side of box 63 adjacent one of the arms 41. This switch is suitably a Micro-Switch, which is the registered trade-mark of a product of the Micro-Switch Division of the First Industrial Corp. of Freeport, Illinois. However, any other sensitive switch may be used which is adapted to be actuated mechanically, thermally or otherwise in response to a predetermined temperature setting. The particular switch shown, which is well known in the art, is actuated by pin 64. Normally, a spring holds pin 64 in outwardly extended position with the switch closed. A very slight inward movement of pin 64 operates to open the switch.

Switch 63 is so positioned that pin 64 is positioned opposite but in close proximity to an arm 41. The clearance between pin 64 and arm 41 is adjusted in the following manner: Bolts 65 secured by nuts 65a pass through brackets 60 and through ovate slots 66 in transverse bar 61, so as to permit a slight lateral movement of said bar. This movement may be accomplished manually with delicate control by means of adjusting screw 70 passing through downwardly extending tab or flange 71 at the end of bar 61 opposite to switch 63. The end of screw 70 engages the adjacent arm 41. It will be seen that by turning screw 70 to the right or to the left, the distance between pin 64 and its adjacent arm 41 can be adjusted, as desired, the purpose of which will be explained hereinbelow. Spring 72 secured at one end (nearer switch 63) to bracket 60 and at the opposite end to lug 73 secured to bar 61 functions to urge bar 61 to the right (in the view of Fig. 3) and to hold switch 63 and pin 64 away from arm 41.

Figure 2:
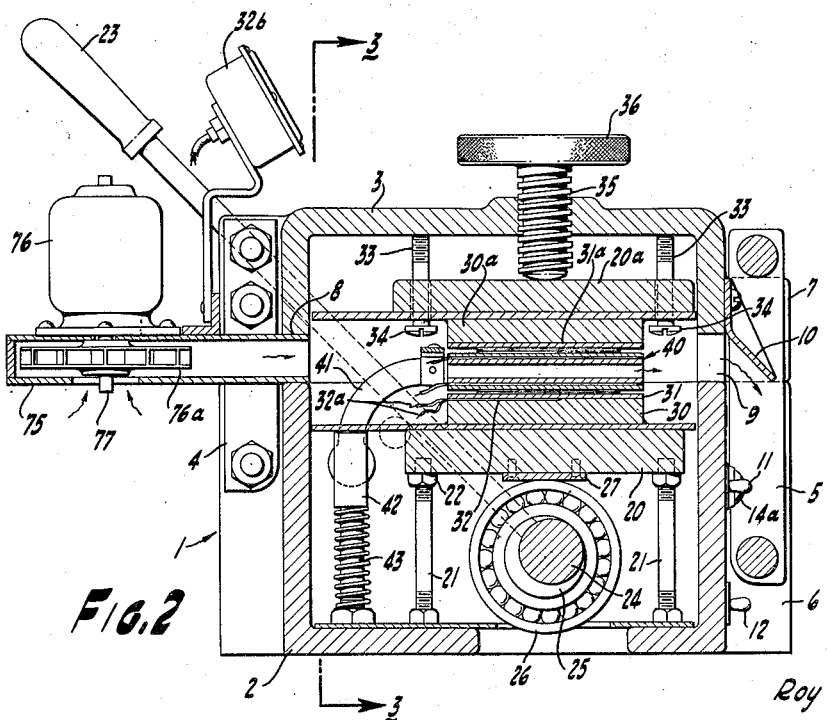
Fig. 2 is a sectional view taken along the line 2—2 of Fig. 1.

Referring now more particularly to Fig. 2, a fan case 75 is positioned rearwardly of cover 3 and in alignment with passage 8. Mounted on the fan case is an electric motor 76, with its shaft 77 keyed to the hub of fan 76a in such manner that, when the motor is operating, a current of air will pass through passage 8 and the passageways 46 in heating element 40 and outwardly through passage 9 in the front of the apparatus.

Figure 7:
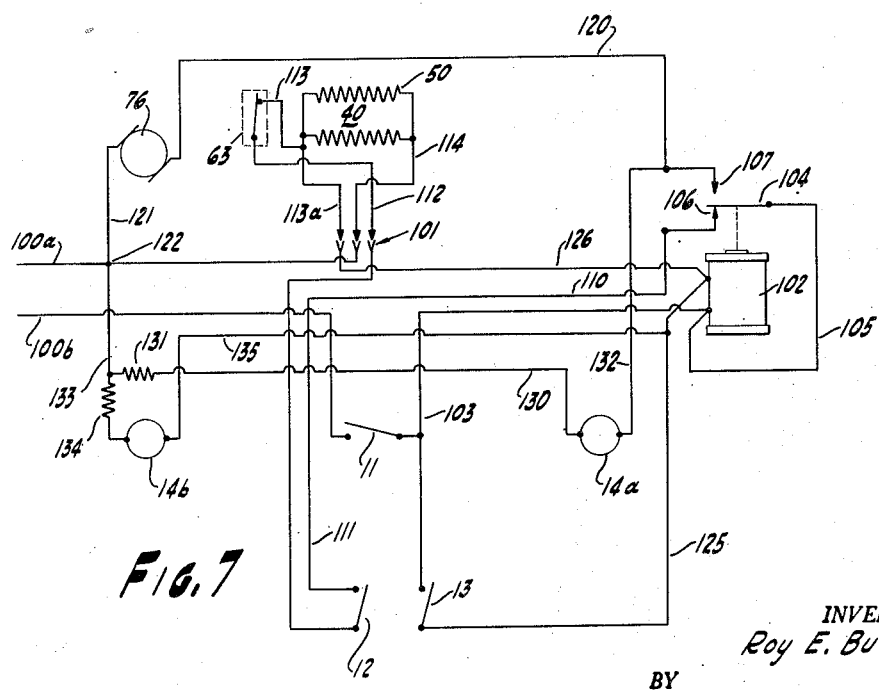
Fig. 7 is a schematic wiring diagram.

Referring now to Fig. 7 of the drawings, showing diagrammatically the electrical wiring of the apparatus, one power lead, 100a of a power line connects with one terminal of a three-pronged plug and socket 101 and the other power lead, 100b, connects with one terminal of main switch 11. The heater circuit through resistance wires 50 of heating element 40 (which are shown, for simplicity, as a pair of resistances) during the heating cycle, is as follows: One terminal of a relay coil 102 is connected with the opposite terminal of main switch 11 through lead 103 and also with relay switch 104 through lead 105. Relay switch 104 is actuated by relay coil 102 so as to contact either of two relay contacts 106 and 107, but is normally in contact with 106. Contact 106 is in turn connected through line 110, low heat switch 12, lead 111, a second terminal of plug-and-socket 101 and lead 112 to one terminal of thermostatic switch 63. The opposite terminal of switch 63 is connected through lead 113 to resistance wires 50, the two wires being in parallel, and is also connected through branch lead 113a to the third terminal of plug-and-socket 101. The heater circuit is completed through resistance wires 50, lead 114, plug-and-socket 101 and power lead 100a.

The motor-fan circuit is through power lead 100b, main switch 11, leads 103 and 105, relay switch 104 and contact 107 (when closed, as explained hereinbelow); thence lead 120, motor 76 and lead 121 connecting with power lead 100a at terminal 122.

Other, subsidiary circuits paralleling the main circuits described above, will be better explained by the ensuing description of operation of the electrical circuits.

As described above, the objects to be molded are placed within their respective molds, the mold assemblies are placed in position, one on lower platen 20 and the other on heating element 40, cover 3 is shut and locked and suitable pressure is applied to the platens by screw 35 and lever 23. Adjusting screw 70 will meanwhile have been adjusted to cause impingement of pin 64 against arms 41 when a predetermined temperature is reached, whereby thermostatic switch 63 will be opened. This adjustment requires only a minimum of trial and error, such as a few settings of screw 70 and readings of thermometer 32b for calibration. A circular card (not shown) may, indeed, be mounted on arm 41 encircling the shaft of screw 70, with radial temperature markings thereon in accordance with the calibrations.

Then main switch 11 is closed and current passes through lead 100b, switch 11, and lead 103. Since relay switch 104 is in contact with relay contact 106, while contact 107 is open, the relay coil 102 is short-circuited and current passes through leads 105 and 110, low heat switch 12 (which is normally closed), lead 111, plug 101, lead 112, thermostatic switch 63, lead 113, heating element 40 (i. e., through resistance wires 50), lead 114, plug 101 and power lead 100a.

When the predetermined temperature has been reached, and aluminum spacer 45 of heating element 40 has expanded sufficiently to contact pin 64, thermostatic switch 63 opens, thus interrupting the heater circuit and removing the short circuit from relay coil 102. Relay coil 102 then operates to contact switch 104 with contact 107. Current then passes through lead 120, motor 76, lead 121 and power lead 100a. Motor 76 operates fan 78, which blows air through passages 46 in spacer 45, thus cooling heating element 40, platens 20 and 20a and the mold assemblies. During the cooling cycle, spacer 45 will contract and disengage pin 64, thus allowing thermostatic switch 63 to close. However, since relay contact 106 is now open and contact 107 is closed, current will not pass through the heater circuit but will continue to pass through the motor circuit.

When the heating and cooling cycles have been completed, main switch 11 is opened, which causes relay contact 106 to close and contact 107 to open in readiness for the next heating cycle. The mold assemblies are removed and new assemblies are inserted for repetition of these cycles.

To provide additional safety and nicety of control, over-riding switch 13 and low heat switch 12 are provided. Thus, if for any reason it is desired to heat the mold assembly above the thermostatic setting, over-riding switch 13 is closed, which short circuits relay coil 102, insures closing of relay contact 106 and opening of contact 107, (to prevent current flowing through the motor circuit) and passes current to heating element 40 through leads 125 and 126. On the other hand, should it be desirable to cut out the heater circuit and start the motor circuit before the thermostatic setting has been reached, low heat switch 12 is opened, which interrupts the heater circuit and removes the short circuit of relay coil 102, which closes contact 107 and starts motor 76.

Indicating lights 14a and 14b, which conveniently have distinguishing colors, indicate, respectively, normal operation of the motor circuit and operation of the heater circuit through over-riding switch 13. Light 14a is shunted across the motor circuit by lead 130 having resistance 131, and lead 132. Light 14b is shunted across the heater circuit, while over-riding switch 13 is closed, by lead 133 having resistance 134, and lead 135.

It will be understood that variations in the structure, design and wiring of the apparatus described above may be made within the scope of the invention. It will also be understood that the apparatus of the invention is adapted to molding diverse types of plastic objects, including those of intricate design, and not alone to molding simple objects such as enclosures for identification cards. The advantages of the apparatus, including its dependable, automatic functioning and its ease of operation are applicable to a great diversity of molding jobs, and can be used with both thermoplastic and thermosetting resins.

It will also be apparent that other types of thermostatic elements well known in the art may be used in place of the aluminum grid or spacer 45, the Invar bar 61 and the pin actuated switch 63. However, the thermo-mechanical mechanism shown is preferred in that it is economical, dependable and easily adjustable. This latter system is operative as long as there is a substantial differential between the thermal expansibilities of spacer 45 and bar 61, although it is preferred to use a material such as aluminum or its alloys in the spacer and a material such as Invar in the bar to provide a very wide differential.

Having thus described my invention, what I claim and desire to secure by Letters Patent is:

1. A molding apparatus comprising top and bottom platen members, means for applying pressure to said top and bottom platen members, a middle platen member positioned between said top and bottom platen members and provided with heating means and with a plurality of passages extending through the member, and means for interrupting the supply of heat to the middle platen member and for initiating flow of air through said passages when the middle platen member reaches a predetermined temperature.

2. Molding apparatus comprising top and bottom platen members; means for applying pressure thereto; a middle platen member provided with passages extending therethrough and with an electric heating element positioned within said member and adjacent each face thereof, said middle member being constructed of a metal having a high thermal coefficient of expansion; a heating circuit including said heating elements and also including a pressure sensitive switch so positioned with respect to said middle member as to remain closed until said member reaches a predetermined temperature and to open by pressure exerted by the expanding middle member when said predetermined temperature is reached; a cooling circuit normally open while said pressure-sensitive switch is closed, and normally closed while said switch is open, said cooling circuit including a motor; and a fan driven by the motor and so positioned as to blow air through said passages in the middle platen member.

3. A molding apparatus comprising a plurality of platens adapted to compress and support a mold assembly, including a heated platen formed with air passages extending therethrough, an electrical heating element for said heated platen, a heating circuit for said element, means including an electric motor for passing air through said passages, a circuit for said motor, means for closing said heating circuit, means for opening said heating circuit when the heated platen reaches a predetermined temperature, and means for automatically closing said motor circuit when said heating circuit is thus opened.

4. A molding apparatus comprising a plurality of platens adapted to compress and support a mold assembly, including a heated platen formed with air passages extending therethrough, an electrical heating element for heating said heated platen, a heating circuit for said element, means including an electric motor for passing air through said passages, a circuit for said motor, means for closing said heating circuit, thermally operable means for opening said heating circuit when the heated platen reaches a predetermined temperature, means for automatically closing said motor circuit when said heating circuit is thus opened, and means for overriding said thermally operable means and said automatic means whereby said platen may be heated above said predetermined temperature.

5. A molding apparatus comprising a plurality of platens adapted to compress and support a mold assembly, including a heated platen provided with air passages extending therethrough and with an electric heating element, an electric heating circuit for said heating element, a fan for passing air through said air passages and an electric motor for operating said fan, an electric circuit for said motor, a switch for said heating circuit including a pressure responsive contact member, means associated with said heated platen operable upon thermal expansion to actuate said pressure-sensitive contact to open said switch, a master switch and a relay associated with said heating circuit and motor circuit operable to close said heating circuit when said master switch is closed and to open said heating circuit and close said motor circuit when said heated platen reaches a predetermined temperature.

ROY E. BUTLER.

REFERENCES CITED

The following references are of record in the file of this patent:

UNITED STATES PATENTS

| Number | Name | Date |
| --- | --- | --- |
| 958,813 | Kelly | May 24, 1910 |
| 1,417,993 | Heeren | May 30, 1922 |
| 1,443,378 | Ordway | Jan. 30, 1923 |
| 1,531,415 | Said | Mar. 31, 1925 |
| 1,537,697 | Roberts | May 12, 1925 |
| 1,798,136 | Barker, Jr. | Mar. 31, 1931 |
| 1,949,275 | Heintz | Feb. 27, 1934 |
| 1,979,471 | Knopp | Nov. 6, 1934 |
| 2,184,270 | Campbell | Dec. 26, 1939 |